United States Patent [19]
Johnson

[11] Patent Number: 5,739,639
[45] Date of Patent: Apr. 14, 1998

[54] METHOD AND APPARATUS FOR OPERATING LED ARRAY AND CHARGING BATTERY FOR EMERGENCY LED OPERATION INCLUDING DC BOOST CIRCUIT ALLOWING SERIES CONNECTION OF LED ARRAY AND BATTERY

[75] Inventor: James C. Johnson, Conyers, Ga.

[73] Assignee: NSI Enterprises, Inc., Atlanta, Ga.

[21] Appl. No.: 675,109

[22] Filed: Jul. 3, 1996

[51] Int. Cl.[6] .................................................. H02J 9/06
[52] U.S. Cl. .................................................. 315/86; 307/64
[58] Field of Search .......................... 362/20, 800, 812; 315/86, 87, 160, 161, 170, 171, 172, 173–176, 200 R, 209 R, 291; 307/64, 66; 340/815.45

[56] References Cited

U.S. PATENT DOCUMENTS

| | | |
|---|---|---|
| 4,682,147 | 7/1987 | Bowman ........................ 340/815.45 |
| 5,459,955 | 10/1995 | Ruskouski et al. ........................ 40/570 |

Primary Examiner—Robert Pascal
Assistant Examiner—David H. Vu
Attorney, Agent, or Firm—Kenneth E. Darnell

[57] ABSTRACT

Circuitry for operating an array of light emitting diodes such as in an emergency exit sign in a non-emergency AC mode while concurrently charging and maintaining the charge of a low-voltage battery used to drive the array in an emergency mode, the circuitry also allows operation of the same LED array in the emergency mode from the low-voltage battery. The advantages of the invention are realized in part through provision within the circuitry of a boost converter wherein the LED array and the battery are connected across the output of the usual boost circuit output capacitor, thereby allowing connection of the array and the battery in series to simplify operation from line power and to allow the same current limited source to operate the array and simultaneously charge the battery through the same current path. The functions so provided can be embodied in a form which allows all circuitry components including the battery to be mounted on a single, compact substrate such as a printed circuit board.

23 Claims, 5 Drawing Sheets

METHOD AND APPARATUS FOR OPERATING LED ARRAY AND CHARGING BATTERY FOR EMERGENCY LED OPERATION INCLUDING DC BOOST CIRCUIT ALLOWING SERIES CONNECTION OF LED ARRAY AND BATTERY

BACKGROUND OF THE INVENTION

1. Field of the Invention

The invention relates generally to emergency lighting systems and particularly to circuitry for operating an array of light sources such as light emitting diodes in both normal and emergency modes while allowing battery charging using the same current path.

2. Description of the Prior Art

Possibly the most common form of illuminated sign is the exit sign which takes a variety of forms. In a usual application, exit signs are placed above doorways or in egress paths to indicate the most efficient manner of exiting an environmental space in the event of emergency. Most emergency exit signs operate in the normal, non-emergency mode on AC mains power. A discontinuation of AC power normally signals an emergency condition requiring operation of the sign on DC power generated by a battery normally contained within each sign. While exit signs have long used various sources of light for operation in the normal and emergency modes, it has been common practice to illuminate such signs with incandescent lamps. Signs so illuminated are commonly available in the art, a set of two lamps operable on 120 volt AC typically being used for normal, non-emergency operation with a second set of low voltage lamps driven by DC current from the battery providing illumination when normal AC power is not available. Signs illuminated by incandescent light sources are wasteful of energy when compared to more recently developed light sources and further require frequent replacement in the case of AC lamps and testing in the case of DC lamps. As an answer to the energy inefficiency and requirement for frequent replacement of prior AC incandescent lamps commonly used in emergency exit signage, as well as other illuminated signage, the art has recently come to the use of light emitting diodes in the form of LED arrays for illumination in the normal, non-emergency AC mode. The use of light emitting diodes provide the advantages of greater energy efficiency and greater life expectancy of the LED sources. The art has not, however, totally eliminated the use of incandescent lamps, especially low voltage DC "emergency" lamps, even in exit signage using an LED array for non-emergency illumination. The primary reason for this seemingly unwarranted practice is that a single array of light emitting diodes is not readily optimized for operation on both high voltage AC and low voltage DC. In most emergency lighting devices utilizing light emitting diodes as light sources, an LED array is optimized for operation in the normal, non-emergency AC mode with low voltage incandescent lamps being used for operation directly from a battery in the event of AC power failure. In emergency lighting devices utilizing LED light sources in both normal and emergency modes, a transformer operated at line frequency can be used to operate an LED array at low voltage in both normal and emergency modes. This practice is not without deficiencies since an efficient transformer is of a relatively large size and weight while a relatively smaller transformer would be less efficient and can dissipate as much energy as the LED array. Further, the cost of a transformer and attendant switching circuitry, typically a mechanical relay, add significantly to cost.

A need therefore exists in the art to provide a simple, light weight and cost-effective system for operation of an array of light emitting diodes in both the normal mode and in the emergency mode. The present invention provides this capability and further allows concurrent charging and maintenance of charge of the battery required for emergency mode power. With use of relatively few light emitting diodes of a certain increased brightness relative to those light emitting diodes first used in exit sign applications, the present invention further allows a battery size and capacity reduction with operation being possible with approximately one-half watt of energy as can be provided by a single AA battery. According to the invention, the LED array and the battery are connected across the output of a boost circuit output capacitor, thereby enabling connection of the LED array and battery in series to simplify operation from line power and to allow the same current limited source to operate the LED array in both modes and simultaneously charge the battery using the same current path. A relatively compact, light weight and cost-effective system is thus provided which is further characterized by optimum energy efficiency.

SUMMARY OF THE INVENTION

The invention provides circuitry capable of operating an array of light emitting diodes in an emergency exit sign or other illuminated sign on mains voltage and also from DC current supplied from a low-voltage battery. The present circuitry is further capable of concurrently charging and maintaining the charge of the low voltage battery during operation on AC mains voltage. While the circuitry of the invention is primarily useful in an emergency exit sign, it is to be understood that the invention could be used with other illuminated signage wherein the capabilities of the circuitry are desired.

The present circuitry is configured to be sufficiently compact and light weight, even when considering the weight of a battery required for DC operation, to allow the entire illumination sub-system of an exit sign or the like to be placed on a strip of printed circuit board and compactly disposed within the interior of an exit sign of particularly reduced dimensions. In the present circuitry, light sources taking the form of high brightness light emitting diodes are provided in series with a battery, the light emitting diodes and the battery being connected across the output of a usual boost circuit output capacitor. Therefore, the light emitting diodes are operable from line power with the same current limited source being capable of operation of the light emitting diode light sources in both modes along with simultaneous charging of the battery through the same current path. The circuitry so provided is capable of operation of the light emitting diode light sources with an extremely small battery when in the DC emergency mode, thereby resulting in a complete circuit conformation including the battery and the light emitting diodes which is very compact, light in weight and cost effective.

The present circuitry operates an array of light emitting diodes in both the normal AC mode and in the DC emergency mode along with concurrent charging and maintenance of charge of the battery when in the normal AC mode. Operational effectiveness is improved and weight is reduced by the present circuitry due at least in part to connection of the light emitting diode array and the battery across the output of a boost circuit output capacitor to enable connection of the LED array and battery in series, thus simplifying operation from line power and allowing the same current limited source to operate the LED array in both modes along with battery charging using the same current path.

It is therefore an object of the invention to provide circuitry for operation of an LED array in exit signage and the like, the array using a relatively few light emitting diodes of increased brightness to result in a significant reduction in battery size and capacity, the circuitry operating the LED array in AC and DC modes while concurrently charging and maintaining the charge of the battery.

It is another object of the invention to provide circuitry for operation of an LED array on both AC mains power and DC battery power while concurrently charging the battery and maintaining the charge of the battery by connecting the LED array and the battery across the output of a booster circuit output capacitor to enable connection of the LED array and battery in series to simplify operation from line power and to allow the same current limited source to operate the LED array in both modes and simultaneously charge the battery using the same current path.

It is a further object of the invention to provide the functions enumerated above in a cost effective manner without the requirement for transformers, relays and the like so as to allow all components of the circuitry, including the battery, to be mounted on a single compact printed circuit board within the confines of an emergency exit sign or the like.

Further objects and advantages of the invention will become more readily apparent in light of the following detailed description of the preferred embodiments

DESCRIPTION OF THE PREFERRED EMBODIMENTS

Figure 1:
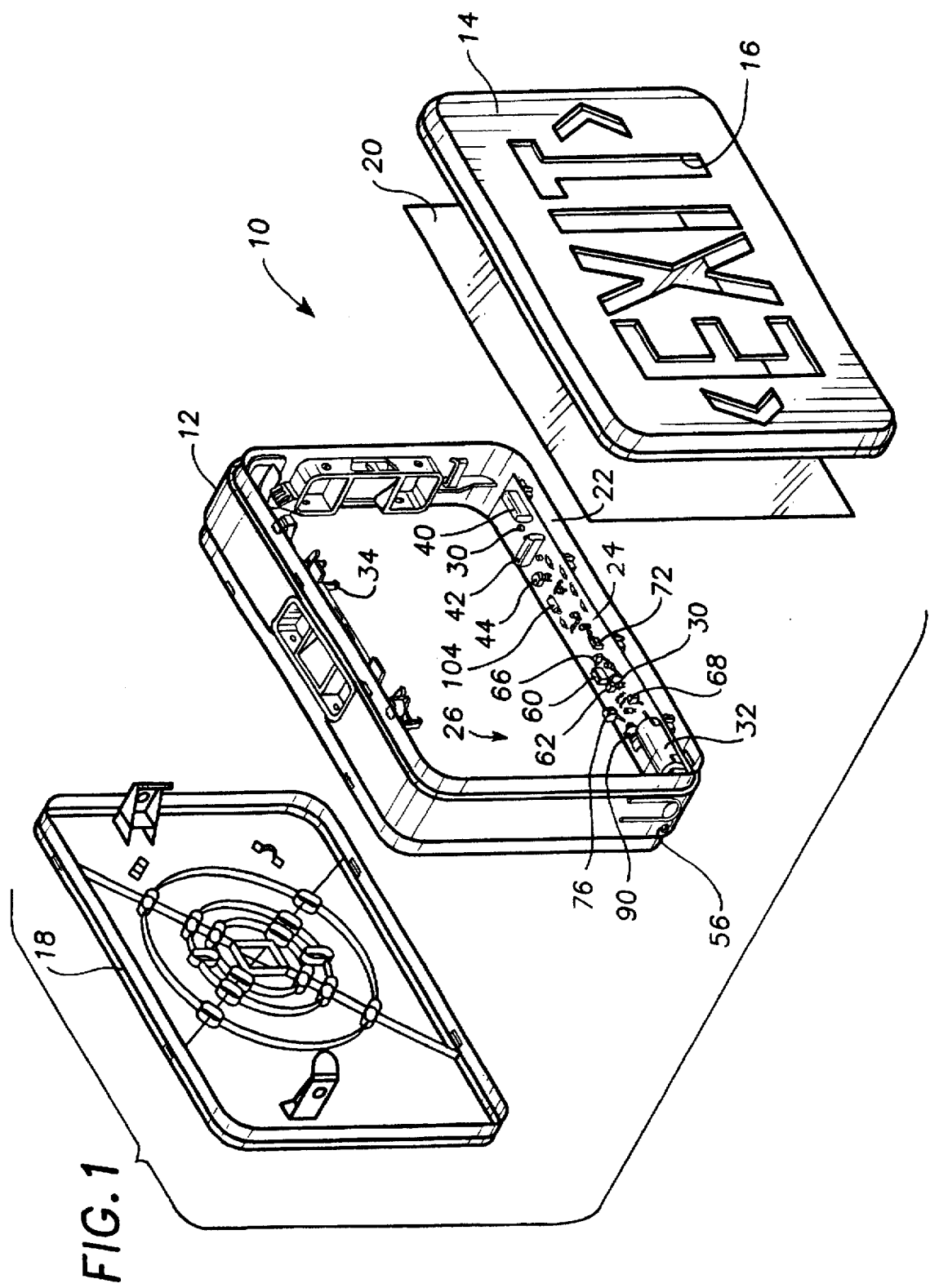
FIG. 1 is a perspective view of an exit sign wherein the circuitry of the invention is mounted on a strip of a printed circuit board for compact disposition within the interior of an exit sign.

Referring now to the drawings and particularly to FIG. 1, an exit sign is seen generally at 10 to comprise a housing 12, a front cover plate 14 having indicia 16 formed therein, a rear mounting plate 18 and a diffusion panel 20 mounted to the front cover plate 14 to provide background for the indicia 16. The exit sign 10 is shown in an assembly view so that the various components of the sign 10 can be better appreciated.

Interiorly of the sign 10 and mounted to a lower interior wall 22 of the housing 12 is a printed circuit board 24 to which circuit 26 is mounted. The circuit 26 comprises an array 28 of light emitting diodes 30 and includes a battery 32 for operation of the array 28 in an emergency mode when AC mains power is unavailable for operation of the array 28. As illustrated in FIG. 1, the circuit 26 is shown to be totally mounted on the printed circuitboard 24 in a compact conformation with the weight of the circuit 26 including the weight of the light emitting diodes as well as the battery 32 resulting in an unusually light weight structure which is compactly fit within the interior of the sign 10. The exit sign 10 can therefore be formed with dimensions which are unusually small when compared to a typical exit sign.

The housing 12 is molded as a unitary structure capable of various modifications in operational use other than as particularly provided by the circuit 26. For example, AC lamp mounts 34 are formed intergrally with the housing 12 in the event that incandescent AC lamps (not shown) are chosen for operation in the emergency AC mode. Ony one of the lamp mounts 34 is readily visible in FIG. 1.

The exit sign 10 of FIG. 1 thus illustrates a particular environment wherein the present circuit 26 is of particular utility due to the ability to compactly configure the circuit 26 and dispose the circuit 26 including the array 28 of light emitting diodes 30 and the battery 32 on the printed circuit board 34, thereby providing an exceedingly compact and light weight illumination system having particular cost effectiveness due to the ability of the circuit 26 to operate the array 28 in both emergency and non-emergency modes. Still further, the size of the exit sign 10 can be substantially reduced in part due to the compact and light weight nature of the circuit 26 and the components thereof as described herein.

Figure 2:
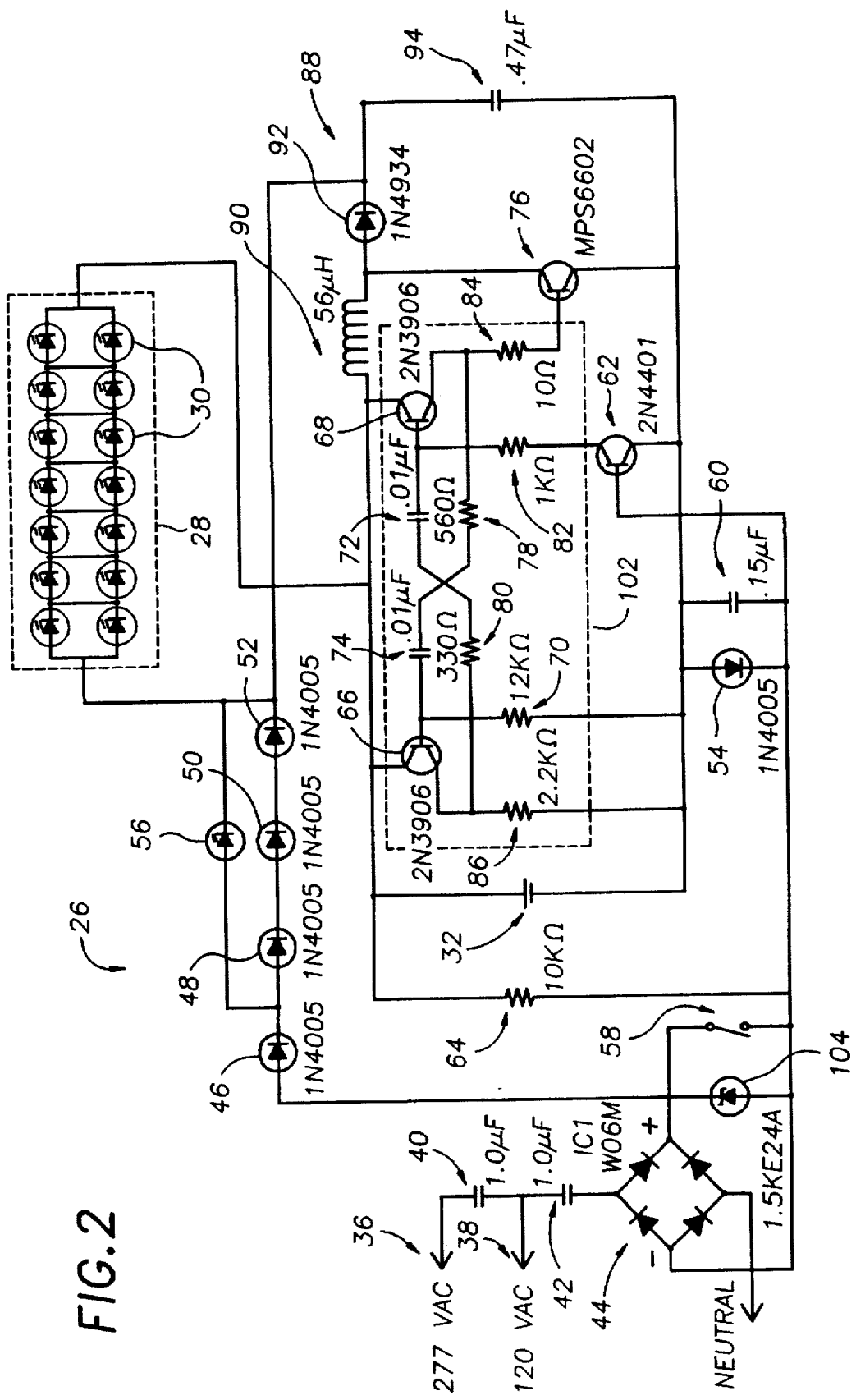
FIG. 2 is a circuit diagram illustrating the circuitry of the invention.

Referring now to FIG. 2, a detailed schematic of the circuit 26 is seen in a preferred embodiment to be operable from either 120 volts AC or from 277 volts AC in the normal, non-emergency mode. Selection of the specific voltage is determined by connection in a conventional manner as seen to the left of the schematic of FIG. 2. The circuit 26 is seen to include the array 28 of light emitting diodes 30 as well as the battery 32 as aforesaid. The light emitting diodes 30 are conveniently selected to be red light emitting diodes with a total number of fourteen of the diodes in series being desirable in the circuit 26.

Considering first the operation of the circuit 26 when AC line power is available and is present at either connection point 36 or connection point 38, this normal, non-emergency mode finds capacitors 40 and 42 presenting an impedance to the 60 Hz incoming power and representing an initial current limiting impedance. In the case of 277 AC line voltage, both of the capacitors 40 and 42 will operate as the initial current limiting impedance. In the case of 120 AC voltage, only the capacitor 42 will act as the initial current limiting impedance. The capacitors 40 and 42 can be sized to provide proper charge current for the battery 32 and also for proper LED operating current as will be described hereinafter. From the initial connection point, a current path can be traced which includes diode bridge 44, a string of diodes identified as diodes 46, 48, 50 and 52, the LED array 28, the battery 32 and a diode 54. This single current path operates the LED array 28 and simultaneously charges the battery 32. Diodes 48, 50 and 52 are present to provide the operating potential for the charge indicator 56 which comprises a light emitting diode. Diode 46 is present in the circuit to block energy from battery-powered operation when test switch 58 is depressed. Diode 54 allows identification of the presence or absence of AC power and in combination with a smoothing capacitor 60 holds the base of transistor 62 at 0.7 volts below the emitter potential as long as current flow exists from the AC source. On loss of AC power from the line source, the base of the transistor 62 will become forward biased due to the pull-up resistor 64, thus serving to turn on an oscillator circuit comprised of transistors 66 and 68.

The oscillator circuit including the transistor 66 and 68 is better understood by consideration of the state of the oscillator circuit when transistor 62 is in the off condition, it being understood that the transistor 62 functions as a control transistor. As long as the transistor 62 is in the off condition, no base current is provided to the transistor 68. An analysis of the circuit under this condition will show that the transistor 66 will be in an on condition due to base current through resistor 70. A small charge thus results upon capacitor 72 due to the saturation voltage of the transistor 66. Capacitor 74 will experience very little charge due to base-emitter drops in the transistor 66 and in transistor 76. Any charge which may develop due to high supply conditions will establish a voltage with the lead connected to the base of the transistor 66 having the more positive potential. When the transistor 62 turns on in response to a loss of line AC power, the transistor 68 will immediately turn on, thus pulling the base of the transistor 66 toward the positive rail. The transistor 66 then turns off since the base-emitter junction will no longer be forward biased. The capacitor 74 will immediately begin to charge back toward this bias level through the resistor 70 and resistor 78. During this same period of time, the capacitor 72 will charge through resistor 80 and the resistor 86. The charge on the capacitor 74 will subsequently reach a level necessary for the base-emitter junction of the transistor 66 to once again conduct. This action of the transistor 66 turning on will concurrently pull the end of the capacitor 72, connected through the resistor 80, toward the positive rail. The charge on the capacitor 72 will create a further offset toward the positive rail and will therefore turn off the transistor 68. In a mirror image of the previous charging of the capacitor 74 while the transistor 68 was in the on condition, the capacitor 72 will immediately begin to charge through the resistor 80 and resistor 82. Similarly, the capacitor 74 will be "reset" by a path through resistors 78, 84 and the base-emitter junction of transistor 76. Thus, the charge on the capacitor 72, which in time reaches the threshold of conduction of the base-emitter junction of the transistor 68 and causes the transistor 68 to conduct, repeats the cycle between the transistor 66 and the transistor 68. This cyclic action continues as long as energy is supplied from the battery 32 or until line power is restored and the transistor 62 is once again turned off.

An R-C time constant consisting of the resistors 70, 78 and the capacitor 74 controls the "on" time of the transistor 68 while an R-C time constant consisting of the resistors 80, 82 and the capacitor 72 will control the "off" time. The initial conditions of the capacitors 72 and 74 in these relationships will be somewhat affected by the time constants of their charge in the opposite direction, namely, (resistor 86+resistor 80)* capacitor 72 and (resistor 78+resistor 84)* capacitor 74. Since the transistor 68 is used as the driver for the transistor 76, it is seen that the same time constants govern the operation of the transistor 76. If the R-C time constant (resistor 70+resistor 78)* capacitor 74 is made much larger than the time constant of the (resistor 80+resistor 82)* capacitor 72 combination, then the circuit can be made to function as a duty-cycle controller having a significant "on" time as compared to the "off" time. The necessary prerequisite for a boost converter is therefore provided and is exactly the function of boost converter circuit 88 comprised of inductor 90, the transistor 76 and fast recovery diode 92. While not necessarily apparent from the schematic of FIG. 2, the drive transistor 76 is nested within oscillator circuit in a particular fashion. It is to be understood that some small current is present in the base of the transistor 76 during the time when the transistor 76 must be in the off condition. This small current results from the path consisting of the resistor 78, the resistor 84, the capacitor 74 and the base-emitter junction of the transistor 66. Accordingly, the resistor 78 is made somewhat larger in order to minimize this small current and to assure that the transistor 76 will remain in the off condition during the proper interval.

The boost converter circuit 88 operates such that energy is stored in the inductor 90 during the time when the transistor 76 is in the on condition. This action places the inductor 90 directly across the battery 32 and causes current to ramp up in accordance with the well-known E=Ldi/dt relationship. When the transistor 76 is turned off, the stored energy within the inductor 90 will be additive with battery voltage to charge capacitor 94 through diode 92. Repetition of this action will result in a current drawn from the battery 32 which is basically triangular in shape and which is controlled by the input voltage, the size of the inductance provided by the inductor 90 and the "on" time of the transistor 76. This energy is transferred directly to the capacitor 94 and to the load of the LED array 28 with only minor energy losses associated with the inductor 90 and with the switching of the transistor 76 and the diode 92.

Figure 3:
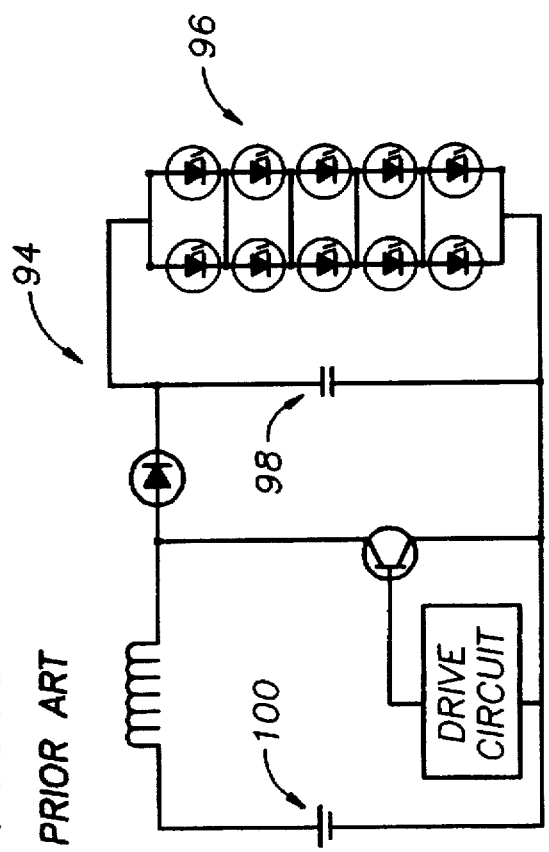
FIG. 3 is a prior art diagram illustrating a conventional boost circuit load connection when used with an array of light emitting diodes.

In order to appreciate fully the manner by which the boost converter circuit 88 departs from the configuration of a conventional boost circuit, reference is made to FIG. 3 which illustrates a prior art boost circuit configuration. Conventional boost circuit 92 connects a load 96 comprised of an LED array directly across output capacitor 98. In the conventional circuit 94, the load circuit path does not include battery 100. Such a prior art configuration is seen in U.S. Pat. No. 5,410,453, which in this aspect represents the current state of the art.

Figure 4:
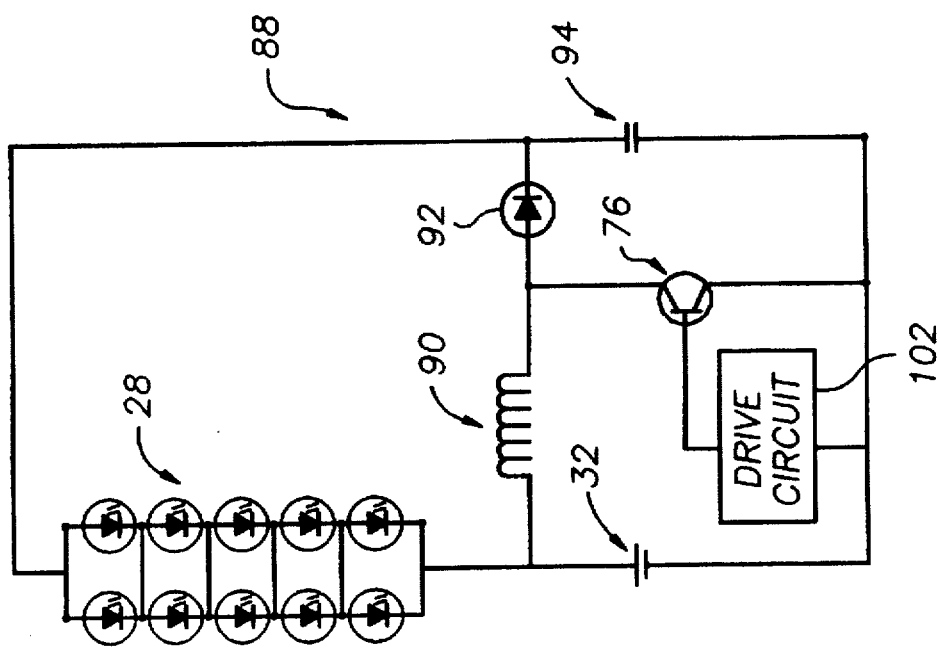
FIG. 4 is a diagram illustrating the boost circuit load connection of the invention which allows series connection of a battery and a load comprised of light emitting diodes.

Referring now to FIG. 4, a schematic representing the boost converter circuit 88 of the present invention is seen to connect the LED array 28 and the battery 32 across the output of an output capacitor which corresponds to the capacitor 94 of FIG. 2. While this connection is of no particular significance to the operation of the boost converter circuit 88 in the DC mode, it is the enabling feature which allows the connection of the LED array 28 and the battery 32 in series. This connection greatly simplifies the operation from line power and allows the same current limited source to both operate the LED array 28 and simultaneously, that is, using the same current path, charge the battery 32. In prior art circuitry, it is necessary to switch an LED lamp load between two points in the circuit using mechanical relays which are subject to wear and eventual failure.

Drive circuit 102 of FIG. 4 corresponds to those circuitry components noted in FIG. 2 to comprise the transistors 66, 68; capacitors 72, 74; and resistors 70, 78, 80, 82, 84 and 86. The transistor 62 acts to turn the drive circuit 102 on and off and as such could be considered to be part of said circuit 102.

Referring now again to FIG. 2 in order to complete description of the circuit 26, a diode 104 is seen to be useful as a surge protection device against transients to protect circuitry downstream of the diode 104 from any spike on the line. Still further, the diode 104 limits voltage downstream when the battery 32 is removed from the circuit 26. Since the battery 32 can be removed from the circuit 26 in the intended configurations of the invention, a large voltage will appear when the battery 32 is removed, such as for replacement, on interruption of the current path. Particularly when 277 VAC is utilized, the appearance of this large voltage is unacceptable. Accordingly, the diode 104 limits voltage in the event of current path interruptions such as would occur on removal of the battery 32 from the circuit 26. The diode 104 can conveniently take the form of a Zener diode.

In assembly of the circuit 26, low cost bipolar transistors are utilized, these transistors being made to operate from low voltage which can be as low as that of a single 1.2 volt cell. In contrast, commonly available integrated circuits for similar purposes have minimum voltage requirements which are several times as great. The circuit 26 also avoids the use of mechanical relays to switch between AC power and battery operation as is necessary in most prior art circuitry. A single 1.2 volt cell can be used in the circuits of the invention due at least in part to utilization of bipolar transistors according to the invention which have saturation levels as low as 200 millivolts at low currents. While some commercially available integrated circuits can operate at low voltages, such integrated circuits are not cost effective in comparison to the drive circuit 102. The circuit 26 functions to provide the objects of the invention with none of the disadvantages noted above which are common in the prior art. The configuration of the invention provides a user with a very low energy, long-life light source which operates from both normal power and battery power. The configuration of the invention provides a system where maintenance is seldom required. Battery replacement, for example, can be readily accomplished using available batteries such as a single replaceable NiCd AA cell such as is commonly available in contrast to the special purpose battery packs of prior art configurations. Due to greater operational lifetime, a conventional 4/5 A cell is preferred for use as the battery 32.

Figure 5:
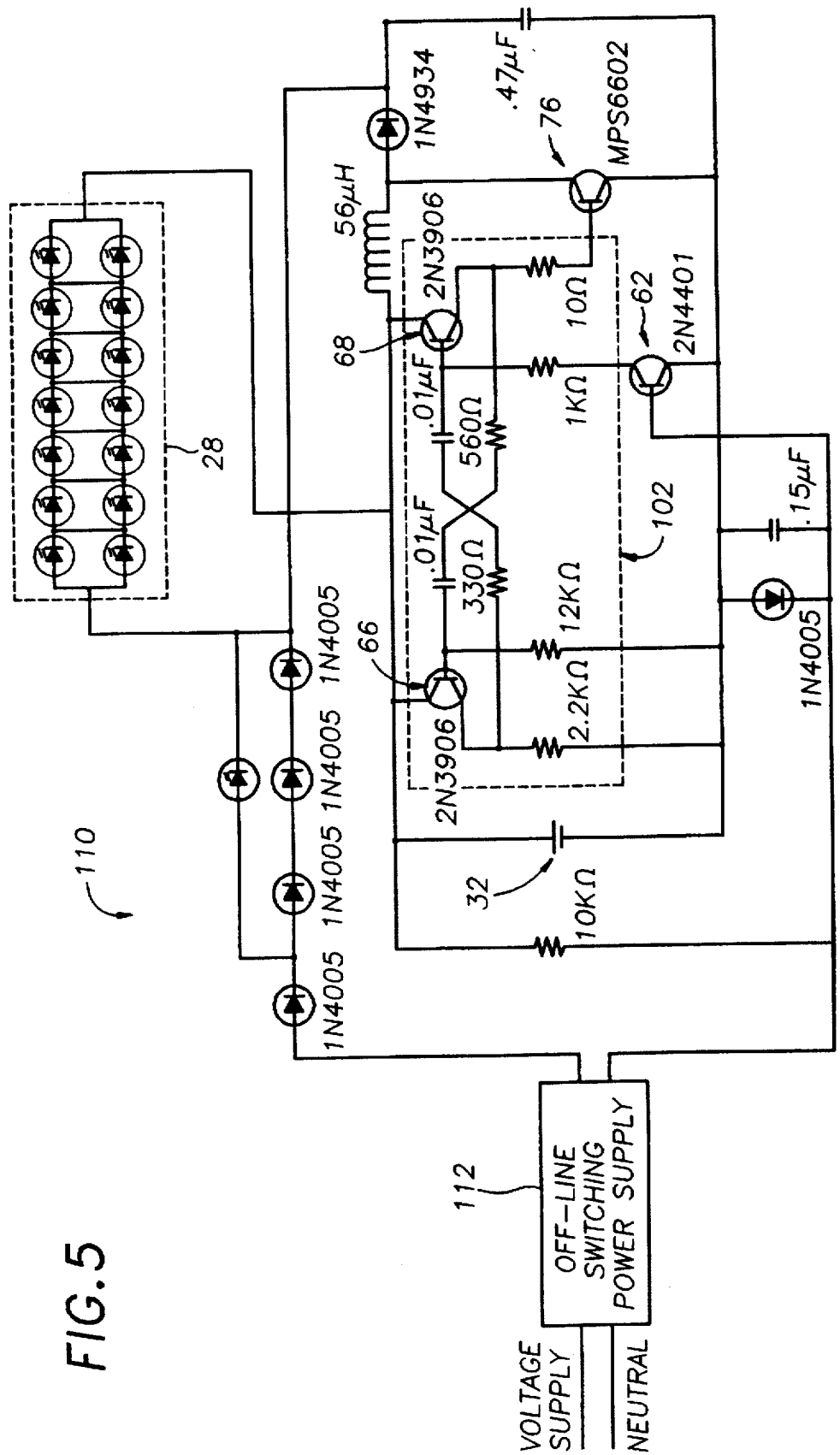
FIG. 5 is a circuit diagram illustrating an embodiment of the invention which utilizes a switching power supply as the current limited source inter alia; and, FIG. 6 is a circuit diagram illustrating an embodiment of the invention which utilizes a switching power supply in addition to the current limiting capacitors as shown in FIG. 2.

Referring now to FIG. 5, a switch mode input embodiment of the invention is seen to comprise circuit 110 which includes an off-line switching power supply 112 which substitutes for the functions of the capacitors 40 and 42 as well as the Zener diode 104 and the diode bridge 44 of the circuit 26 of FIG. 2. While the switching power supply 112 assumes a number of functions in the circuit 110, the switching power supply 112 primarily provides the function of the capacitors 40 and 42 of FIG. 2, that is, the switching power supply 112 functions as the current limited source. The switching power supply 112 can take the form of any of the available off-line switching power supplies now common in the art. Remaining portions of the circuit 110 are seen to be essentially identical to corresponding circuit elements of the circuit 26 of FIG. 2 and like numerals are provided for certain of the components of the circuit 110 of FIG. 5 which correspond to the circuit elements of FIG. 2 in order to provide a frame of reference. For convenience, only a representative number of these circuit elements are identified by the use of like numerals. The remaining circuit elements are readily identifiable as to type and function.

The switching power supply 112 of FIG. 5 adapts to the voltage present from the voltage supply which is input to the switching power supply 112 within the voltage rating thereof. In the circuit 110, the switching power supply 112 is rated to conveniently include 120 VAC and 277 VAC but may include other useful voltages as desired.

The commercially available forms which can comprise the switching power supply 112 will not usually include the provision of the test switch 58 of FIG. 2. Accordingly, a test switch (not shown) would be desirably provided in the circuit 110 to correspond in function to the test switch 58 of FIG. 2 in the event that the switching power supply 112 of FIG. 5 does not include a testing feature.

Figure 6:
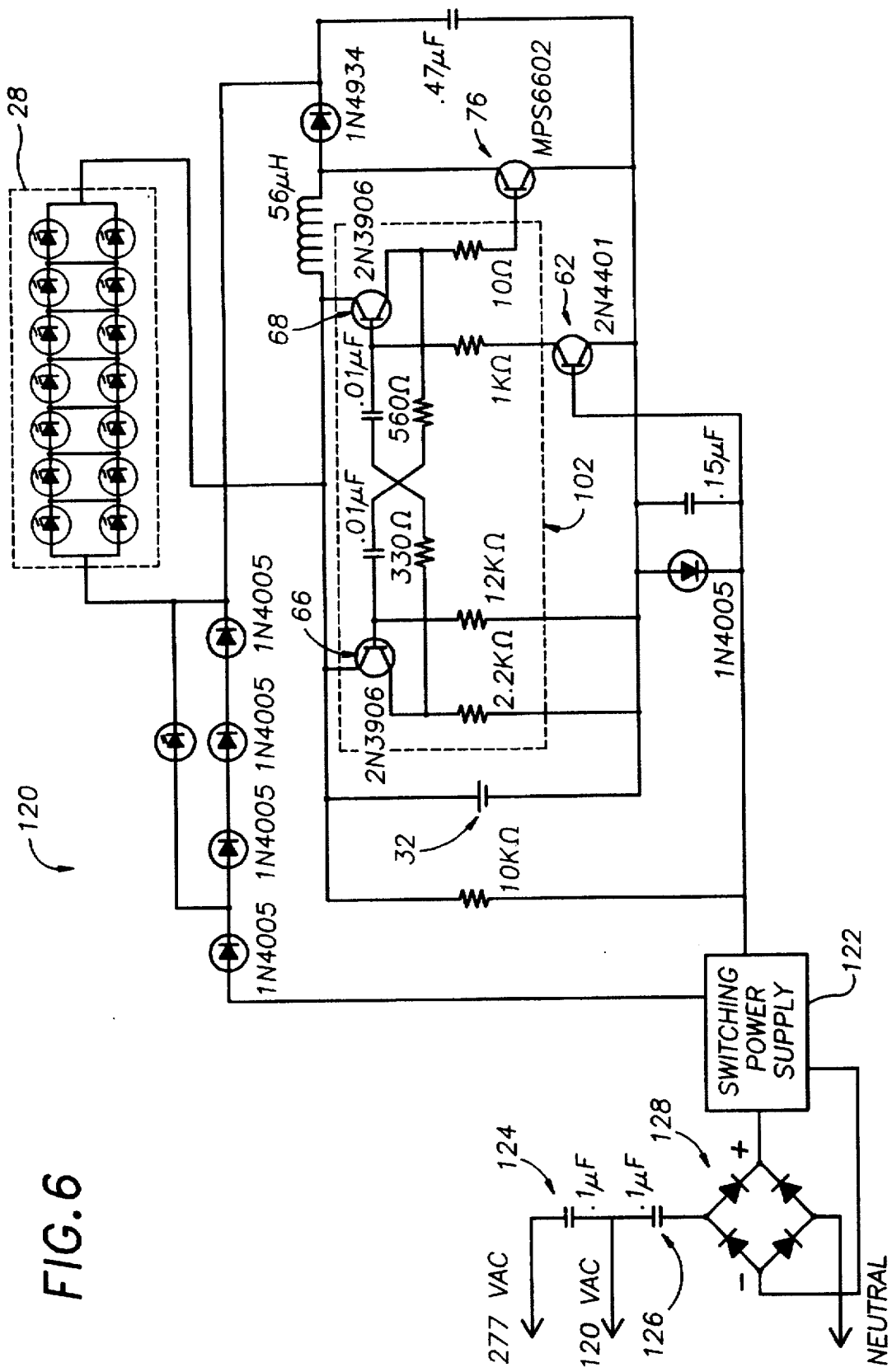

Referring now to FIG. 6, a further embodiment of the invention is seen to comprise a circuit 120 having a switching power supply 122 used in combination with capacitors 124 and 126. When the switching power supply 122 is used in the circuit 120, the capacitors 124 and 126 can be much smaller than the 1.0 µF capacitors 40 and 42 of FIG. 2. As shown in FIG. 6, the capacitors 124 and 126 can be within the range of about 0.1 µF each or some chosen value between 1.0 µF and 0.1 µF. The circuit 120 would include diode bridge 128 which would provide a rectification function in the manner of the diode bridge 44 of FIG. 2. In the circuit 120 the switching power supply would see a voltage of approximately 40 to 50 volts, the circuit 120 being constructed in remaining portions thereof essentially as is seen in the circuit 26 of FIG. 2. Like numerals are provided in FIG. 6 for certain components of the circuit 120 which correspond to circuit components of FIG. 2 in order to provide a frame of reference. For convenience only a representative number of these circuit components are identified by the use of like numerals. The remaining circuit components are readily identifiable as to type and function.

The capacitors 124 and 126 of the circuit 120 are of a small physical size when compared to the capacitors 40, 42 of the circuit 26 shown in FIG. 2. In a surface mount situation, this reduced size provides packaging advantages even though the cost of the switching power supply 122 likely causes circuit cost to be somewhat greater even in view of the realtively small size of the capacitors 124, 126.

Accordingly, it is believed that the foregoing provides a description of preferred embodiments which are exemplary in nature and which are not limiting of the scope of the invention, the invention being defined by the scope of the appended claims.

What is claimed is:

1. In a circuit having an array of light emitting diodes operable on AC mains power and on DC power from a battery when mains power is unavailable, battery charging and charge maintenance circuitry, a current limited source, and a boost converter circuit having an output capacitor, the LED array and the battery being connected across the output of the output capacitor to connect the LED array and the battery in series, thereby allowing the current limited source to operate the LED array on AC mains power with simultaneous charging and maintenance of charge of the battery through the same current path without switching or repositioning circuit components during DC operation.

2. In the circuit of claim 1 wherein the current limited source comprises at least one capacitor.

3. In the circuit of claim 1 wherein the current limited source comprises a switching power supply.

4. In the circuit of claim 1 wherein the boost converter circuit further comprises an inductor and a diode, the boost converter circuit being driven by a transistor having a base, energy being stored in the inductor when the transistor is in the "on" condition, the inductor therefore being directly across the battery to cause current to ramp up, stored energy within the inductor adding to battery voltage when the transistor is turned off to charge the output capacitor through the diode.

5. The circuit of claim 4 wherein the transistor comprises a bipolar transistor.

6. The circuit of claim 5 wherein the transistor has a saturation level as low as 200 millivolts.

7. In the circuit of claim 4 wherein the battery comprises a single 1.2 volt cell.

8. In the circuit of claim 4 and further comprising means for identifying the presence of AC power on the circuit.

9. In the circuit of claim 8 wherein the identifying means comprise a diode and a smoothing capacitor located in the circuit between the source of mains power and the LED array, the diode and the smoothing capacitor holding the base of the transistor below emitter potential during AC current flow.

10. In the circuit of claim 9 and further comprising an oscillator circuit which is turned on by forward biasing of the base of the transistor on loss of AC power.

11. In the circuit of claim 10 wherein the oscillator circuit comprises two transistors.

12. In the circuit of claim 4 and further comprising a drive circuit for operation of the boost converter circuit.

13. In the circuit of claim 1 and further comprising means for limiting voltage across the circuit in the event of interruption of circuit current path such as occasioned by removal of the battery from the current path.

14. In the circuit of claim 13 wherein the voltage limiting means comprises a Zener diode.

15. In the circuit of claim 1 wherein the current limited source comprises at least one capacitor and a switching power supply.

16. In the circuit of claim 1 and further comprising means for identifying the presence of AC power on the circuit.

17. A method for operating a circuit including an LED array by means of AC mains power and by DC power from a battery when AC power is unavailable and charging and maintaining charge of the battery during operation by AC mains power, the circuit including a boost converter circuit having an output capacitor and a current limited source, comprising the steps of:

connecting the LED array and the battery across the output of the output capacitor to connect the array and the battery in series;

operating the LED array by means of the current limited source on AC power; and, simultaneously charging and maintaining the charge of the battery through the same current path used for operation of the LED array.

18. The method of claim 17 wherein the current limited source comprises at least one capacitor.

19. The method of claim 17 wherein the current limited source comprises a switching power supply.

20. The method of claim 17 wherein the current limited source comprises at least one capacitor and a switching power supply.

21. In a circuit having an array of light emitting diodes operable on AC mains power and on DC power from a battery when mains power is unavailable, battery charging and charge maintenance circuitry, a current limited source, and a boost converter circuit having an output capacitor and being driven by a transister having a base, the light emitting diode array and the battery being connected across the output of the output capacitor to connect the light emitting diode array and the battery in series, the circuit further comprising means for identifying the presence of AC power on the circuit, the identifying means comprising a diode and a smoothing capacitor located in the circuit between the source of mains power and the light emitting diode array, the diode and the smoothing capacitor holding the base of the transistor below emitter potential during AC current flow, thereby allowing the current limited source to operate the LED array on AC mains power with simultaneous charging and maintenance of charge of the battery through the same current path.

22. In the circuit of claim 21 and further comprising an oscillator circuit which is turned on by forward biasing of the base of the transistor on loss of AC power.

23. In the circuit of claim 22 wherein the oscillator circuit comprises two transistors.

* * * * *